United States Patent [19]

Nicopoulos et al.

[11] Patent Number: 5,284,939
[45] Date of Patent: Feb. 8, 1994

[54] PROCESS FOR THE PREPARATION OF HIGHLY CONCENTRATED SOLUTIONS OF CATIONIC AZO DYES

[75] Inventors: Alex Nicopoulos, Basel; Hanspeter Birri, Pratteln, both of Switzerland; Gerhard Hanika, Lörrach, Fed. Rep. of Germany

[73] Assignee: Ciba-Geigy Corporation, Ardsley, N.Y.

[21] Appl. No.: 882,981

[22] Filed: May 14, 1992

[30] Foreign Application Priority Data

May 17, 1991 [CH] Switzerland .................. 1474/91

[51] Int. Cl.$^5$ .................. C09B 41/00; C09B 67/34
[52] U.S. Cl. .................. 534/582; 534/589; 534/604; 534/605; 534/606; 534/610; 534/615; 8/527
[58] Field of Search .................. 534/615, 604, 605, 606, 534/610, 582; 8/527

[56] References Cited

U.S. PATENT DOCUMENTS

| | | | |
|---|---|---|---|
| 3,658,781 | 4/1972 | Hegar | 534/606 |
| 3,726,852 | 4/1973 | Calla et al. | 534/609 |
| 4,057,388 | 11/1977 | Defago et al. | 8/471 |
| 4,264,496 | 4/1981 | Durant | 534/589 |
| 4,432,899 | 2/1984 | Linhart et al. | 534/615 |
| 4,468,349 | 8/1984 | Linhart et al. | 534/615 X |

FOREIGN PATENT DOCUMENTS

| | | |
|---|---|---|
| 0012053 | 6/1980 | European Pat. Off. . |
| 0046237 | 2/1982 | European Pat. Off. . |
| 0056578 | 7/1982 | European Pat. Off. . |
| 0066405 | 12/1982 | European Pat. Off. . |
| 1644389 | 10/1970 | Fed. Rep. of Germany . |
| 1794368 | 5/1973 | Fed. Rep. of Germany . |
| 1595309 | 7/1970 | France ........ 8/527 |
| 579125 | 8/1976 | Switzerland ........ 534/606 |
| 1133683 | 11/1968 | United Kingdom ........ 534/615 |
| 1154006 | 6/1969 | United Kingdom ........ 534/605 |
| 1211078 | 11/1970 | United Kingdom ........ 534/605 |
| 1281162 | 7/1972 | United Kingdom ........ 534/605 |
| 1295825 | 11/1972 | United Kingdom . |

OTHER PUBLICATIONS

Wroblewski et al, Chemical Abstracts 98: 145027X(1983).

Primary Examiner—Mary C. Lee
Assistant Examiner—Fiona T. Powers
Attorney, Agent, or Firm—Kevin T. Mansfield; Edward M. Roberts

[57] ABSTRACT

There is described a process for the preparation of highly concentrated aqueous solutions of specific cationic azo dyes. The solutions are prepared by diazotising a diazo component in a solution which contains sulfuric acid, coupling the diazotised component to a coupling component, treating the resultant azo dye with a bicarbonate, and converting the dye bicarbonate with an organic acid into the dye salt of said acid.

16 Claims, No Drawings

PROCESS FOR THE PREPARATION OF HIGHLY CONCENTRATED SOLUTIONS OF CATIONIC AZO DYES

The present invention relates to a novel process for the preparation of highly concentrated aqueous solutions of salts of cationic azo dyes.

A process for the preparation of salts of cationic dyes is disclosed in DE-A-1 644 389. This process comprises treating a water-soluble salt of a cationic dye with a water-soluble bicarbonate and then, in a further optional step, subjecting the bicarbonates so obtained to treatment with a mineral acid or an organic acid. Dyes deriving from the indazole and benzimidazole series are named as suitable dyes. These dyes are used in all Examples as chlorides.

After the conversion to the dyestuff bicarbonates according to the teaching of this DE-A-1 644 389, it is not possible to remove the chlorides completely. Even after reaction with an organic acid, the dye solutions will therefore contain residual amounts of chlorides, which may lead to corrosion of storage containers and/or dyeing apparatus. Moreover, problems can arise when storing some dyes at low temperature (c. 0°–5° C.), as the dye partially crystallises from chloride-containing solutions.

It has now been found that these problems can be avoided in the case of specific azo dyes by carrying out the diazotisation in a solution which contains sulfuric acid and, after coupling, precipitating the dye as sulfate or hydrogen sulfate. Surprisingly, the dye precipitates in a form which can be very readily filtered and washed off, so that the dye is obtained virtually free from chloride, even if a chloride-containing coupling component has been used.

Accordingly, the invention relates to a process for the preparation of highly concentrated aqueous solutions of salts of cationic azo dyes, which comprises a) diazotising an amine of formula $$D-NH_2 \quad (1)$$

wherein D is an unsubstituted or substituted radical of the benzene, thiazole, benzothiazole or thiadiazole series, in a solution which contains sulfuric acid, and subsequently b) coupling the diazotised amine with a coupling component of formula

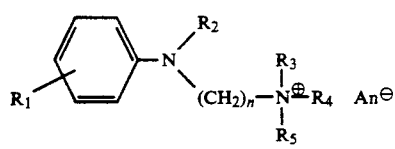

(2)

wherein
$R_1$ is hydrogen, $C_1$–$C_4$alkyl, $C_1$–$C_4$alkoxy, halogen or $C_1$–$C_4$alkanoylamino,
$R_2$ is hydrogen or $C_1$–$C_4$alkyl,
n is an integer from 2 to 6,
$R_3$, $R_4$ and $R_5$ are each independently of one another unsubstituted or substituted alkyl, or
$R_3$ and $R_4$, together with the linking nitrogen atom, or $R_3$, $R_4$ and $R_5$, together with the linking nitrogen atom, form a heterocyclic radical, or $R_3$ and $R_4$ are each $C_1$–$C_4$alkyl and $R_5$ is amino, and $An^{\ominus}$ is an anion, and then c) treating the resultant azo dye with a water-soluble bicarbonate, and d) converting the dye bicarbonate with an organic acid into the dye salt of said acid.

The amines of formula (1) are preferably anilines of formula

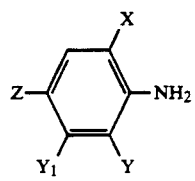

(3)

wherein
X is hydrogen, halogen, cyano or nitro,
Y and $Y_1$ are each independently of the other hydrogen or halogen, and
Z is nitro, $C_1$–$C_4$alkylsulfone or N,N-di-$C_1$–$C_4$-alkylsulfamoyl, or thiazoles of formula

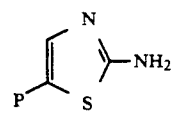

(4)

wherein P is hydrogen or nitro, or benzothiazoles of formula

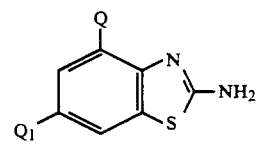

(5)

wherein Q and $Q_1$ are each independently of the other hydrogen, halogen or nitro, or thiadiazoles of formula

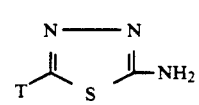

(6)

or

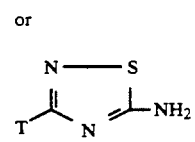

(7)

wherein T is hydrogen or unsubstituted or substituted phenyl.

Among these amines, the amines of formula

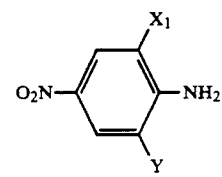

(8)

wherein
$X_1$ is hydrogen, halogen or cyano, and

Y is hydrogen or halogen, are especially preferred.

Halogen is typically fluoro, bromo or, preferably, chloro.

$R_1$ and $R_2$ as alkyl are methyl, ethyl, n-propyl or isopropyl, n-butyl, isobutyl, sec-butyl or tert-butyl; and $R_1$ as alkoxy is methoxy, ethoxy, n-propoxy, isopropoxy, n-butoxy, isobutoxy, sec-butoxy or tert-butoxy.

$R_1$ may also be $C_1$-$C_4$alkanoylamino, typically acetylamino, propionylamino, butyrylamino, isobutyrylamino, valerylamino or isovalerylamino.

$R_3$, $R_4$ and $R_5$ are each independently of one another unsubstituted or substituted alkyl radical. Throughout this specification, unsubstituted or substituted alkyl radicals are generally defined to be for instance methyl, ethyl, n-propyl or isopropyl, n-butyl, isobutyl, sec-butyl or tert-butyl, straight-chain or branched pentyl or hexyl, cyclopentyl or cyclohexyl, which radicals may be substituted, suitably by hydroxy, alkoxy, cyano, carbamoyl or N-mono- or dialkylcarbamoyl, or phenyl which may be further substituted, typically by alkyl or alkoxy.

Representative examples of such substituted radicals are hydroxymethyl, hydroxyethyl, 2-hydroxyprop-1-yl, methoxyethyl, ethoxyethyl, propoxypropyl, benzyl, cyanoethyl or carbamoylethyl.

$R_3$ and $R_4$, together with the linking nitrogen atom, may also be a heterocyclic radical, suitably a pyrrolidino, piperidino, morpholino or piperazino radical, or $R_3$, $R_4$ and $R_5$, together with the linking nitrogen atom, may also be a heterocyclic radical, typically a pyridinium, imidazolium or monoquaternated triethylenediamine radical, which radicals may be substituted, conveniently by $C_1$-$C_4$ alkyl.

Preferably Y is hydrogen and X is hydrogen, cyano or, preferably, chloro.

$R_1$ is preferably hydrogen, methyl or chloro, most preferably chloro in o-position or methyl in m-position to the substituted amino group, and n is preferably 2 or 3.

The preferred meanings of $R_2$ are hydrogen, methyl and, most preferably, ethyl.

$R_3$ and $R_4$ are preferably each methyl and $R_5$ is preferably methyl, hydroxy-$C_1$-$C_3$alkyl, benzyl or amino, or $R_3$, $R_4$ and $R_5$, together with the linking nitrogen atom, are an unsubstituted or methyl-substituted pyridinium radical.

The novel process is especially suitable for the preparation of concentrated aqueous solutions of azo dyes by diazotising an amine of formula (8), wherein Y is hydrogen and $X_1$ is hydrogen or chloro, and coupling the diazotised amine to a coupling component of formula (2), wherein $R_1$ is hydrogen, methyl or chloro, n is 2 or 3, $R_2$ is hydrogen, methyl or ethyl and $R_3$ and $R_4$ are each methyl and $R_5$ is methyl, hydroxy-$C_1$-$C_3$alkyl, benzyl or amino, or wherein $R_3$, $R_4$ and $R_5$, together with the linking nitrogen atom, form a pyridinium radical.

The diazotisation of the amine of formula (1) in a solution which contains sulfuric acid is carried out under per se known conditions, typically with sodium nitrite and in the temperature range from $-10°$ to $30°$ C., preferably $-10°$ to $5°$ C. Prior to diazotisation, the amine of formula (1) is preferably converted into a homogenous fine dispersion by adding a dispersant and/or milling.

The coupling of the amine to the coupling component of formula (2) is also carried out in per se known manner, conveniently in the temperature range from $-10°$ to $+30°$ C., preferably $-5°$ to $+10°$ C.

It has been found useful to stir the reaction mixture for some time after the coupling, conveniently for 0.5 to 3 hours, at elevated temperature, suitably at $50°$-$90°$ C. The reaction mixture is then cooled, preferably to room temperature, whereupon the dye crystallises as sulfate or hydrogen sulfate.

In a preferred embodiment of the novel process, the coupling is carried out under such conditions that the dye is obtained in the form of the hydrogen sulfate. This is usually the case at a pH below c. 1.5.

The precipitated dye is subsequently washed, preferably with an aqueous solution of sulfuric acid which contains sodium sulfate.

Subsequently the dye is treated with a water-soluble bicarbonate to form the dye bicarbonate. This is done by treating the dye in aqueous alkaline solution or suspension in the temperature range from c. $0°$ C. to $70°$ C., preferably from c. $10°$ C. to $40°$ C., with a water-soluble bicarbonate, preferably potassium, lithium or, most preferably, sodium bicarbonate.

The bicarbonate is used in at least stoichiometric proportion, but preferably in excess of stoichiometric proportion, conveniently in up to 20% excess. The precipitated dye bicarbonate is then isolated by filtration and, if required, washed with a bicarbonate solution and/or water. If desired, the above operation is repeated, i.e. the dye is again dissolved in water and precipitated by addition of a bicarbonate and isolated by filtration.

For conversion into a concentrated aqueous solution, the dye bicarbonate is afterwards charged to an organic acid or to an aqueous solution of an organic acid, in which it dissolves very readily with evolution of $CO_2$. Exemplary of suitable organic acids are formic acid, acetic acid, propionic acid, lactic acid, oxalic acid, malonic acid, succinic acid, tartaric acid, chloroacetic acid or methanesulfonic acid. Among these acids the preferred organic acids are formic acid, propionic acid, lactic acid and, most particularly, acetic acid.

The dye solution can, if desired, be diluted with water and further optional additives for adjustment to a specific dye concentration. The solutions have very good storage stability, i.e. they do not crystallise out even after storage for months at low temperature. They are virtually free of chloride and cause no corrosion in conventional apparatus.

The invention is illustrated by the following non-limitative Examples.

EXAMPLE 1

To 450 parts of water are added 2 parts of an anionic dispersant and 259 parts of 2-chloro-4-nitroaniline and the mixture is stirred with a high-speed Rotor-Stator mixer until a homogeneous suspension is obtained. To this suspension are added 1 part of a nonionic dispersant and 670 parts of ice, and then 364 parts of 93% sulfuric acid are added over 20 minutes. The batch is cooled to $-5°$ C. by external cooling, 210 parts of ice are added and 260 parts of 40% sodium nitrite are run in over 25 minutes, while keeping the temperature at c. $0°$ C. The diazotisation mixture is stirred for 1 hour at $0°$-$5°$ C., then excess nitrite is destroyed by addition of sulfamic acid and clarifying filtration is carried out after addition of a filter aid (kieselgur). The residue is washed with 250 parts of water and the wash-water is added to the clear filtrate.

The diazo solution is added over 1 hour to a solution of 394 parts of N-ethyl-2'-(N-ethylanilino)pyridinium chloride and 0.3 parts of a nonionic dispersant in 431 parts of water and 600 parts of ice at a temperature from 0° to 5° C. The coupling mixture is stirred for 3 hours at this temperature, then heated over 1 hour to 70°-72° C. and stirred for another hour at this temperature. Afterwards the coupling mixture is cooled over 2 hours to 25° C. and filtered. The filter residue is washed with 620 parts of a solution of 60 parts of anhydrous sodium sulfate and 20 parts of 93% sulfuric acid in 540 parts of water, giving 832 parts of a moist filter cake with a dye concentration of c. 67% (calculated as cation).

500 parts of water are placed in a reactor and, with stirring, 89 parts of the above moist filter cake are added. After stirring for 15 minutes at 20°-25° C., the pH is adjusted to 7-8 by addition of 30% NaOH solution, whereupon the dye dissolves completely. The dye solution is diluted with 50 parts of water and then 48 parts of sodium hydrogen carbonate are added over 15 minutes. Then the batch is stirred for 2 hours at 20°-25° C., whereupon the dye precipitates in fine crystalline form. The precipitate is collected on a suction filter, and the filter cake is slurried in 450 parts of water, precipitated once more as described above as bicarbonate and collected by filtration.

With stirring, the filter cake is charged over 30 minutes at 20°-25° C. to 60 parts of glacial acetic acid. The mixture is stirred for 2 hours at 20°-25° C. and then diluted with 25 parts of water to make up 200 parts, to give a clear dye solution which exhibits no tendency to crystallise even after prolonged storage at 0° C.

EXAMPLES 2-4

In accordance with the procedure described in Example 1, it is also possible to prepare concentrated aqueous solutions of the following azo dyes:

| Example | Dye |
|---|---|
| 2 | 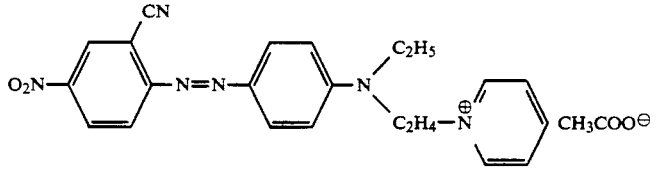 |
| 3 | 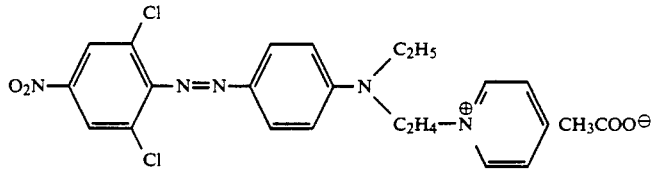 |
| 4 | 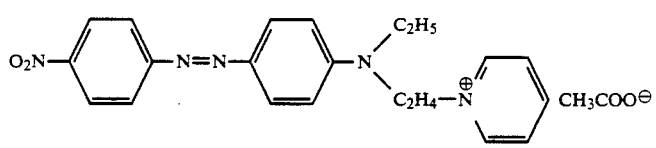 |
| 5 | 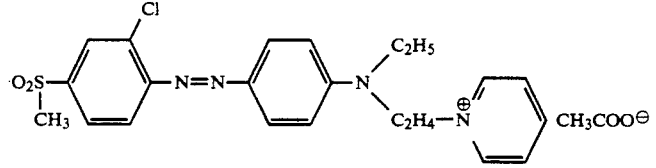 |
| 6 | 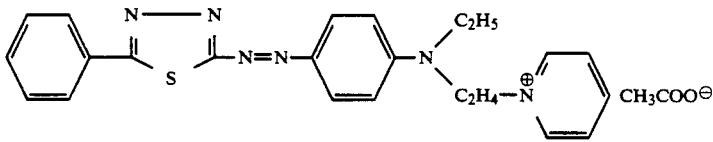 |
| 7 | 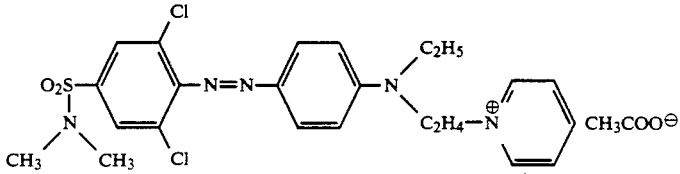 |

-continued

| Example | Dye |
|---|---|
| 8 |  (structure with phenyl-thiadiazole—N=N—phenyl—N(C₂H₅)(C₂H₄—⊕N-pyridinium) CH₃COO⁻) |
| 9 | Dibromobenzothiazole—N=N—C₆H₄—N(C₂H₅)(C₂H₄—⊕N(CH₃)₃) CH₃COO⁻ |
| 10 | O₂N—thiazole—N=N—C₆H₃(CH₃)—N(C₂H₅)(C₂H₄—⊕N-pyridinium) CH₃COO⁻ |
| 11 | Phenyl-thiadiazole—N=N—C₆H₃(CH₃)—N(C₂H₅)(C₂H₄—⊕N(CH₃)₂—CH₂—C₆H₅) CH₃COO⁻ |

What is claimed is:

1. A process for the preparation of a highly concentrated aqueous solution of a salt of a cationic azo dye, virtually free of chlorides, which comprises a) diazotising an amine of formula $$D\text{—}NH_2 \qquad (1)$$

wherein D is an unsubstituted or substituted radical of the benzene, thiazole, benzothiazole or thiadiazole series, in a solution which contains sulfuric acid, and subsequently b) coupling the diazotised amine with a coupling component of formula

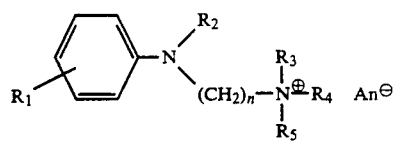

wherein
$R_1$ is hydrogen, $C_1$-$C_4$alkyl, $C_1$-$C_4$alkoxy, halogen or $C_1$-$C_4$alkanoylamino,
$R_2$ is hydrogen or $C_1$-$C_4$alkyl,
n is an integer from 2 to 6,
$R_3$, $R_4$ and $R_5$ are each independently of one another unsubstituted or substituted alkyl or $R_3$ and $R_4$, together with the linking nitrogen atom, or $R_3$, $R_4$ and $R_5$, together with the linking nitrogen atom, form a heterocyclic radical, or $R_3$ and $R_4$ are each $C_1$-$C_4$alkyl and $R_5$ is amino, and An⁻ is an anion, at a pH below 1.5 in the temperature range from −10° to +30° C. and subsequently heating the reaction mixture for 0.5 to 3 hours at 50°–95° C. and then c) washing the resultant azo dye with an aqueous solution of sulfuric acid which contains sodium sulfate, d) treating the precipitated dye in the form of its hydrogen sulfate with a water-soluble bicarbonate, and e) converting the dye bicarbonate with an organic acid into the dye salt of said acid.

2. A process according to claim 1, wherein the amine is an aniline of formula

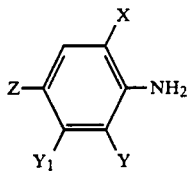

wherein
X is hydrogen, halogen, cyano or nitro,
Y and $Y_1$ are each independently of the other hydrogen or halogen, and
Z is nitro, $C_1$-$C_4$alkylsulfone or N,N-di-$C_1$-$C_4$-alkylsulfamoyl, or a thiazole of formula

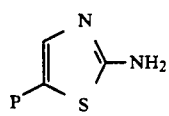

wherein P is hydrogen or nitro, or a benzothiazole of formula

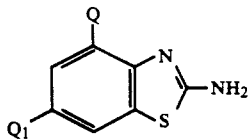
(5)

wherein Q and $Q_1$ are each independently of the other hydrogen, halogen or nitro, or a thiadiazole of formula

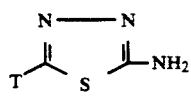
(6)

or

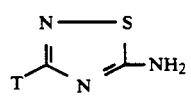
(7)

wherein T is hydrogen or unsubstituted or substituted phenyl.

3. A process according to claim 2, which comprises using an amine of formula

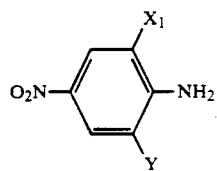
(8)

wherein $X_1$ is hydrogen, halogen or cyano, and

Y is hydrogen or halogen.

4. A process according to claim 3, which comprises diazotising an amine of formula (8), wherein Y is hydrogen and $X_1$ is hydrogen, cyano or chloro.

5. A process according to claim 1, which comprises using a coupling component of formula (2), wherein $R_1$ is hydrogen, methyl or chloro.

6. A process according to claim 1, which comprises using a coupling component of formula (2), wherein n is 2 or 3.

7. A process according to claim 1, which comprises using a coupling component of formula (2), wherein $R_2$ is hydrogen, methyl or ethyl.

8. A process according to claim 1, which comprises using a coupling component of formula (2), wherein $R_3$ and $R_4$ are each methyl.

9. A process according to claim 1, which comprises using a coupling component of formula (2), wherein $R_5$ is methyl, hydroxy-$C_1$-$C_3$alkyl, benzyl or amino.

10. A process according to claim 1, which comprises using a coupling component of formula (2), wherein $R_3$, $R_4$ and $R_5$, together with the linking nitrogen atom, are an unsubstituted or a methyl-substituted pyridinium radical.

11. A process according to claim 1, which comprises diazotising an amine of formula (8), wherein Y is hydrogen and $X_1$ is hydrogen or chloro, and coupling the diazotised amine to a coupling component of formula (2), wherein $R_1$ is hydrogen, methyl or chloro, n is 2 or 3, $R_2$ is hydrogen, methyl or ethyl and $R_3$ and $R_4$ are each methyl and $R_5$ is methyl, hydroxy-$C_1$-$C_3$alkyl, benzyl or amino, or wherein $R_3$, $R_4$ and $R_5$, together with the linking nitrogen atom, form a pyridinium radical.

12. A process according to claim 1, which comprises carrying out the diazotisation with sodium nitrite in a solution which contains sulfuric acid in the temperature range from $-10°$ to $+5°$ C.

13. A process according to claim 1, wherein the azo dye is precipitated by addition of sodium bicarbonate.

14. A process according to claim 1, which comprises dissolving the dye bicarbonate in an organic acid, said acid being selected from the group consisting of formic acid, propionic acid, lactic acid and acetic acid.

15. A process according to claim 14, which comprises dissolving the dye bicarbonate in an aqueous solution of an organic acid.

16. A dye solution obtained according to claim 1.

* * * * *